(12) United States Patent
Goto et al.

(10) Patent No.: US 10,775,198 B2
(45) Date of Patent: Sep. 15, 2020

(54) DISPLACEMENT DETECTION DEVICE

(71) Applicant: AMITEQ CO., LTD., Tokyo (JP)

(72) Inventors: Daisuke Goto, Tokyo (JP); Nobuyuki Akatsu, Tokyo (JP); Kazuya Sakamoto, Tokyo (JP)

(73) Assignee: AMITEQ CO., LTD., Tokyo (JP)

( * ) Notice: Subject to any disclaimer, the term of this patent is extended or adjusted under 35 U.S.C. 154(b) by 100 days.

(21) Appl. No.: 15/772,831

(22) PCT Filed: Nov. 2, 2016

(86) PCT No.: PCT/JP2016/082699
§ 371 (c)(1),
(2) Date: May 2, 2018

(87) PCT Pub. No.: WO2017/078110
PCT Pub. Date: May 11, 2017

(65) Prior Publication Data
US 2018/0313665 A1    Nov. 1, 2018

(30) Foreign Application Priority Data

Nov. 4, 2015    (JP) ................................ 2015-216767

(51) Int. Cl.
*G01D 5/20* (2006.01)
*G01B 7/02* (2006.01)
*G01L 5/00* (2006.01)

(52) U.S. Cl.
CPC ........... *G01D 5/2006* (2013.01); *G01B 7/023* (2013.01); *G01D 5/2026* (2013.01); *G01L 5/00* (2013.01)

(58) Field of Classification Search
CPC ...... G01D 5/20; G01D 5/2006; G01D 5/2026; G01B 7/02; G01B 7/023; G01L 5/00
See application file for complete search history.

(56) References Cited

U.S. PATENT DOCUMENTS

| 5,903,205 | A | 5/1999 | Goto et al. | |
|---|---|---|---|---|
| 2011/0019330 | A1* | 1/2011 | Hunt | H01H 47/14 361/211 |
| 2014/0347075 | A1* | 11/2014 | Goto | G01B 7/003 324/652 |

FOREIGN PATENT DOCUMENTS

| EP | 2792528 A1 | 10/2014 |
|---|---|---|
| JP | H0953909 A | 2/1997 |

(Continued)

OTHER PUBLICATIONS

International Search Report issued in Intl. Appln. No. PCT/JP2016/082699 dated Jan. 31, 2017. English translation provided.

(Continued)

*Primary Examiner* — Son T Le
(74) *Attorney, Agent, or Firm* — Rossi, Kimms & McDowell LLP

(57) ABSTRACT

A device has a construction capable of promoting miniaturization, and comprises: a coil; a magnetism-responsive member disposed so as to be displaced relative to the coil according to a position of a detection object; and a self-oscillation circuit that incorporates the coil therein as an oscillation element so that an oscillation frequency varies with an inductance variation of the coil responsive to an displacement of the magnetism-responsive member relative to the coil. An arithmetic section generates a measured value responsive to oscillation frequency based on an oscillation output of the self-oscillation circuit, calculates velocity data by differentiating successive measured values, and calculates displacement data by integrating the velocity data. An offset error component caused by the peripheral temperature or a mechanical attachment position of the detection device can be automatically cancelled or reduced by the differential operation for calculating the velocity data, and precise displacement detection can be realized.

4 Claims, 5 Drawing Sheets

(56) References Cited

FOREIGN PATENT DOCUMENTS

| | | |
|---|---|---|
| JP | H10153402 A | 6/1998 |
| JP | H10173437 A | 6/1998 |
| JP | H10252549 A | 9/1998 |
| JP | 2000329510 A | 11/2000 |
| JP | 2002328002 A | 11/2002 |
| JP | 2010122012 A | 6/2010 |
| WO | 2013089205 A1 | 6/2013 |

OTHER PUBLICATIONS

Written Opinion issued in Intl. Appln. No. PCT/JP2016/082699 dated Jan. 31, 2017.
Extended European Search Report issued in European Appln. No. 16862170.4 dated Apr. 5, 2019.
Office Action issued in Chinese Appln. No. 201680064578.0 dated Aug. 21, 2019. English translation provided.

\* cited by examiner

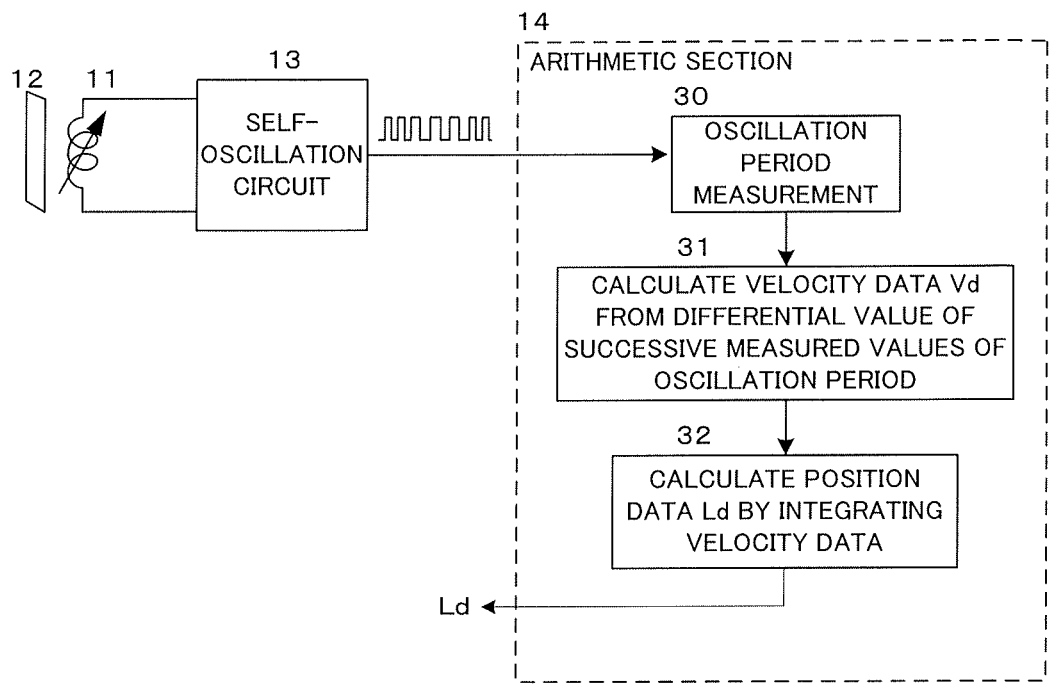
F I G. 1
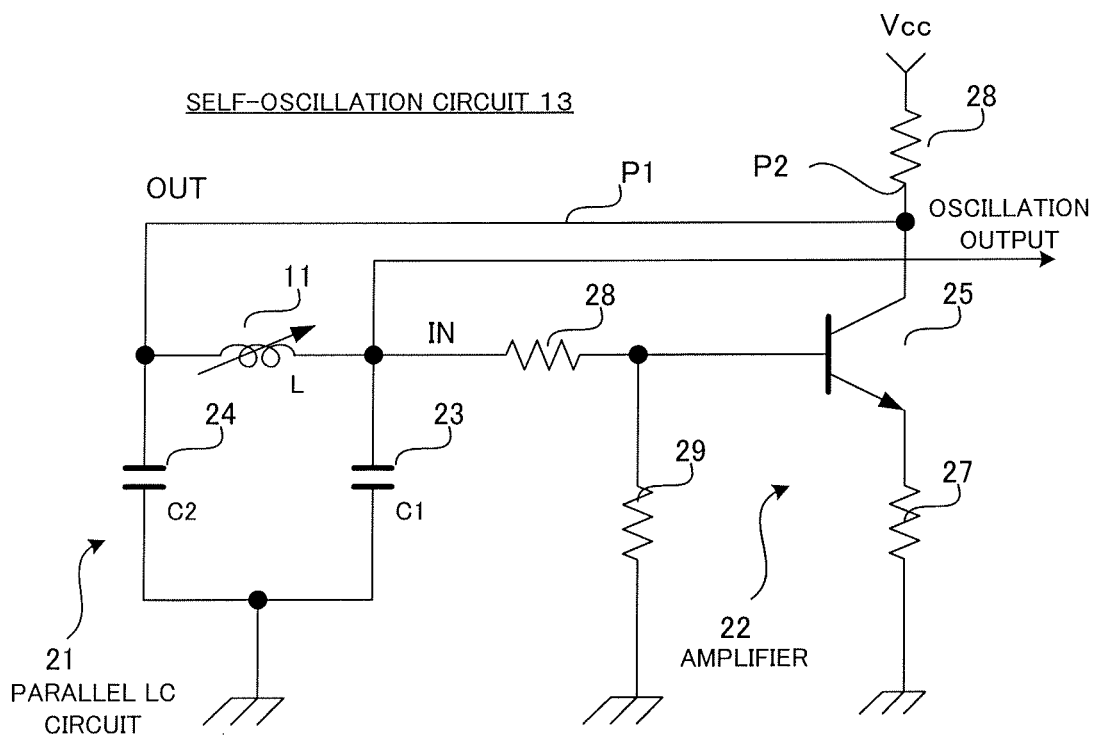
F I G. 2

DISPLACEMENT DETECTION DEVICE

TECHNICAL FIELD

The present invention relates to a displacement detection device of a type which has a coil, functioning as a position detection element, incorporated as an inductance element of a self-oscillation circuit, and which is applicable to various desired types of displacement detection of position, such as a small or minute displacement sensor, a linear position sensor, a rotational position sensor, an inclination sensor, a pressure sensor, a strain sensor, a load sensor, a two-dimensional position sensor, a torque sensor, etc.

BACKGROUND ART

Heretofore, there have been known various types of position detection devices which employ a coil (inductance element) as a detection element. Many of such position detection devices include an AC signal source dedicated to energization of the coil, so that the coil is AC-energized by an AC signal generated from the AC signal source being applied to the coil. Conventionally-known inductive position detection devices are disclosed in Patent Literatures 1 and 2 listed below, for example. Such a conventionally-known inductive position detection device comprises a primary coil and a secondary coil so that the primary coil is energized by an AC signal to induce a secondary output signal in the secondary coil according to the energization, so that inductance of the secondary coil is varied with a relative position, to the coil, of a magnetism-responsive member (e.g., iron, copper, etc) which is displaced in accordance with a position of a detection object to thereby generate the output signal responsive to the position. In this case, an oscillation circuit for oscillating the AC signal for energizing the primary coil is provided separately from the coils.

Also known are proximity sensors which could eliminate the need for a dedicated energizing AC signal source by use of the principle of the LC oscillation circuit, i.e. by incorporating a coil, functioning as a detection element, in a self-oscillation circuit as an inductance element (see, for example, Patent Literature 3). Such self-oscillation type proximity sensors are advantageous in that they can be significantly reduced in size because the need for providing a dedicated energizing AC signal source can be eliminated. However, in a case where an amount of inductance variation in the self-oscillation circuit is small, it is difficult for the sensor to accomplish accurate detection. For example, in a case where a self-oscillation type position detection device comprises a magnetism-responsive member made of iron or the like as a displacement member, conventionally it is difficult to realize the microminiaturization of the device as well as the downsizing of the device.

PRIOR ART LITERATURE

Patent Literature

Patent Literature 1: Japanese Patent Application Laid-open Publication No. HEI-09-053909
Patent Literature 2: Japanese Patent Application Laid-open Publication No. HEI-10-153402
Patent Literature 3: Japanese Patent Application Laid-open Publication No. HEI-10-173437

SUMMARY OF INVENTION

It is therefore an object of the present invention to provide a displacement detection device capable of accurate detection, and it is another object of the present invention to provide a displacement detection device having a construction capable of promoting miniaturization of overall construction.

In order to accomplish the above-mentioned object, a displacement detection device of the present invention comprises: a coil; a magnetism-responsive member disposed so as to be displaced relative to the coil according to a position of a detection object; a self-oscillation circuit that incorporates the coil therein as an oscillation element so that an oscillation frequency varies with an inductance variation of the coil responsive to the displacement of the magnetism-responsive member relative to the coil; and an arithmetic section that generates a measured value responsive to the oscillation frequency on the basis of an oscillation output signal of the self-oscillation circuit, calculates velocity data by differentiating successive measured values, and calculates displacement data by integrating the velocity data.

Because the displacement detection device according to the present invention is constructed to calculate the velocity data based on the variation of the oscillation frequency according to the inductance variation of the coil and then calculate the displacement data by integrating the velocity data, an offset error component caused by the peripheral temperature or a mechanical attachment position of the detection device can be automatically cancelled or reduced by the differential operation for calculating the velocity data. Thus, the present invention can provide a precise displacement detection device. Further, because a scale of velocity data value can be enlarged by suitably setting a time difference to be used for the differential operation to calculate the velocity data, it is possible to adjust the time difference in such a manner that a dynamic range or a scale of the displacement data calculated by the integral operation of the velocity data is suitably enlarged. In this way, even if a displacement of the detection object is small or minute, the detection device can produce displacement data with a magnified value, so that a displacement detection device adapted for detection of small or minute displacement can be realized according to the present invention. Moreover, because the same coil as a position detection element in the detection device is incorporated in the self-oscillation circuit as an inductance element for self-oscillation too, a whole scale of the detection device can be miniaturized, so that the displacement detection device adapted for detection of small or minute displacement can be realized with a miniaturized size.

BRIEF DESCRIPTION OF DRAWINGS

FIG. 1 is a block diagram showing an embodiment of a displacement detection device according to the present invention;

FIG. 2 is a circuit diagram showing an example of a self-oscillation circuit shown in FIG. 1;

FIG. 11(a) is a cross-sectional side view of the torque sensor, FIG. 11(b) is an exploded perspective view of a magnetism-responsive member, and FIG. 11(c) is a front view showing an arrangement of coils.

DESCRIPTION OF EMBODIMENTS

Figure 3A:
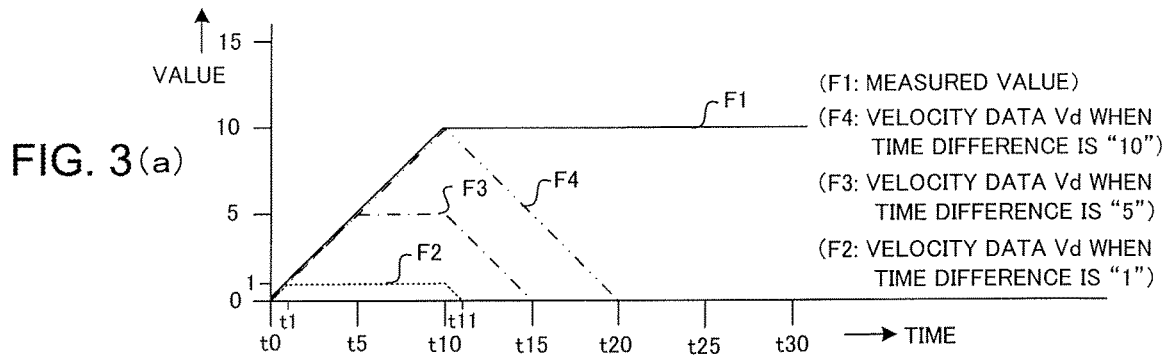
FIGS. 3(a), 3(b), 3(c), and 3(d) are diagrams explanatory of some operation examples of an arithmetic section shown in FIG. 1.

FIG. 1 is a block diagram showing an embodiment of a displacement detection device according to the present invention. As shown in FIG. 1, the displacement detection device comprises: a single coil 11; a magnetism-responsive member 12 that is disposed near the coil 11 in a non-contact fashion so as to be displaced relative to the coil 11 according to a position (mechanical displacement) of a detection object; a self-oscillation circuit 13 that incorporates the coil 11 therein as an oscillation element so that an oscillation frequency varies with an inductance variation of the coil 11 responsive to the displacement of the magnetism-responsive member 12 relative to the coil 11; and an arithmetic section 14 for calculating displacement data corresponding to the position of the detection object on the basis of an oscillation output signal of the self-oscillation circuit 13. The arithmetic section 14 is configured to generate a measured value in digital responsive to the oscillation frequency on the basis of the oscillation output signal of the self-oscillation circuit 13, digitally calculate temporal differential value of the measured value as velocity data, and calculate displacement data (namely, position data) by digitally integrating the velocity data.

FIG. 2 shows an example of the self-oscillation circuit 13 in which the coil 11 is incorporated as an inductance element for self-oscillation. The self-oscillation circuit 13 is a Colpitts oscillator circuit comprising a parallel LC circuit 21 and an amplifier 22. The parallel LC circuit 21 comprises the aforementioned coil 11 functioning as a self-oscillation coil, and capacitors 23 and 24. The amplifier 22 includes a transistor 25 as an amplification element, a source-collector resistor 26, an emitter-ground resistor 27, and base-voltage setting resistors 28 and 29. Note that the amplification element is not limited to a transistor and may be another desired inverted amplification element, such as an FET or operational amplifier. A signal at a connection point between one of the capacitors 23 of the parallel LC circuit 21 and the coil 11 is input to an input terminal (base input) IN of the amplifier 22, and a signal of an output terminal (collector output) OUT of the amplifier 22 is input to a connection point between the other capacitor 24 of the parallel LC circuit 21 and the coil 11. In the illustrated example, the oscillation output signal can be taken out from the input terminal (base input) IN of the amplifier 22. Note that the basic construction of the self-oscillation circuit is not limited to the Colpitts oscillator circuit as shown and described above and may be a Harley oscillator circuit or another type of an RLC oscillator circuit.

Referring now back to FIG. 1, the arithmetic section 14 includes an oscillation period measurement step 30 as means for generating a measured value responsive to the oscillation frequency on the basis of the oscillation output signal of the self-oscillation circuit 13. In this case, for example, in order for facilitating counting a period of the oscillation frequency, a rectangular wave signal having an expanded period may be generated by suitably dividing the frequency of the oscillation output signal, so that the measured value responsive to the oscillation frequency can be generated by counting the expanded period of the rectangular wave signal. Because an inductance of the self-oscillation circuit 13 varies with the displacement of the magnetism-responsive member 12 relative to the coil 11 according to the position of the detection object to thereby change the oscillation frequency, the measured value obtained by the step 30 primitively represents the position of the detection object.

Next, at step 31, velocity data Vd is obtained by digitally calculating a temporal differential value of the measured values successively obtained by the aforementioned step 30. Then, at step 32, position data (namely, displacement data) Ld is calculated by integrating the velocity data Vd obtained by the step 31. The position data (displacement data) Ld obtained by the step 32 is output as a position detection signal (i.e., a displacement detection signal).

Because the detection device is constructed such that first the velocity data Vd is obtained at step 31 and then the position data Ld is obtained by integrating the velocity data Vd at step 32 as aforementioned, an offset error component caused by the peripheral temperature or a mechanical attachment position of the detection device can be automatically cancelled or reduced. For example, even if the measured value obtained at step 30 includes such an offset error component, the offset error component is automatically cancelled when the detection object is stationary because a value of the velocity data Vd obtained at step 31 is null. Also, at the time of mechanically attaching the position detection device to a shaft of the detection object, an origin setting operation can be carried out easily. Namely, because the detection object is stationary at the time of attaching the position detection device to the shaft of the detection object, the velocity data Vd is null, so an arbitrary attachment position of the detection device can be set as an origin position. Further, even when the detection object moves, an error or the offset error component is automatically cancelled. For example, the differential value (i.e., velocity data Vd) calculated at step 31 is expressed by a difference between measured values X0 and X1 at time points t0 and t1 as follows:

$$Vd = X1 - X0 = (a1 + \alpha) - (a0 + \sigma) = a1 - a0,$$

where σ represents the error or the offset error component, X0 is a measured value calculated by step 30 at a time point t0, X1 is a measured value calculated by step 30 at a time point t1, and a0 and a1 are correct measured value components corresponding to respective positions of the detection object at the respective time points t0 and t1. Thus, the differential value (i.e., velocity data Vd) calculated at step 31 represents a precise difference between the respective positions of the detection object at the time points t0 and t1. Because such a precise differential value (i.e., velocity data Vd) is integrated with time at step 32, precise position data Ld from which the error component has been removed can be obtained. Thus, the present invention can achieve precise position detection in which the error or the offset error component σ is automatically removed.

Further, according to the present invention, a time difference for the differential operation to be performed at step 31 can be suitably set. With this arrangement, even in the position detection device which employs such a self-oscillation circuit 13 that shows little change in the oscillation frequency with regard to the inductance variation responsive to the displacement of the detection object, the velocity data Vd and the position data Ld can be generated with a wide dynamic range (or an enlarged numerical scale), so that the precise position detection can be realized by the position detection device having a device construction miniaturized by use of the self-oscillation circuit 13. Further, because the velocity data. Vd and the position data Ld can be generated with the wide dynamic range (or the enlarged numerical scale) even if a displacement range of the detection object is small or minute, the position detection device adapted for detection of small or minute displacement can be realized according to the present invention. Details on this point will be described hereinafter with reference to FIG. 3.

In FIG. 3(a), solid line F1 denotes an example of the successive measured values (namely, primitive position detection data) obtained at step 30 in response to the position of the detection object that is variable with time, and broken line F2, one dot chain line F3 and two-dot chain line F4 denote examples of respective velocity data Vd that are obtained by performing, using three different types of the time difference, the respective differential operations of the successive measured values (primitive position detection data) denoted by the solid line F1. In the example of FIG. 3(a), velocity data Vd denoted by the broken line F2 is obtained by performing the differential operation of the successive measured values (primitive position detection data) using a time difference "1", velocity data Vd denoted by the one dot chain line F3 is obtained by performing the differential operation of the successive measured values (primitive position detection data) using a time difference "5" that is five times the time difference "1", and velocity data Vd denoted by the two-dot chain line F4 is obtained by performing the differential operation of the successive measured values (primitive position detection data) using a time difference "10" that is ten times the time difference "1". In the example of FIG. 3(a), assuming a time difference between the time points t0 and t1 is α (sec.), the differential operation using the time difference "1" means calculating a difference between a measured value (primitive position detection data) X(0) at a particular time point and a measured value (primitive position detection data) X(−1) at a time point earlier for α (sec) than the particular time point, the differential operation using the time difference "5" means calculating a difference between the measured value (primitive position detection data) X(0) at the particular time point and a measured value (primitive position detection data) X(−5) at a time point earlier for 5α (sec.) than the particular time point, and the differential operation using the time difference "10" means calculating a difference between the measured value (primitive position detection data) X(0) at the particular time point and a measured value (primitive position detection data) X(−10) at a time point earlier for 10α (sec.) than the particular time point.

In FIG. 3(a), the measured value (primitive position detection data) denoted by the solid line F1 varies linearly with an incline "1" between the time points from t0 to t10 and then maintains a constant value (10) after the time point t10. The velocity data Vd denoted by the broken line F2 varies linearly with an incline "1" between the time points from t0 to t1, then maintains a constant value "1" between the time points from t1 to t10 and goes to "0" thereafter. The velocity data Vd denoted by the one dot chain line F3 varies linearly with an incline "1" between the time points from t0 to t5, maintains a constant value "5" between the time points from t5 to t10, then varies linearly with an incline "−1" between the time points from t10 to t15 and maintains a value "0" thereafter. The velocity data Vd denoted by the two-dot chain line F4 varies linearly with an incline "1" between the time points from t0 to t10, then varies linearly with an incline "−1" between the time points from t10 to t20 and maintains a value "0" thereafter. In this way, as the time difference for the differential operation performed at step 31 becomes longer, the dynamic range (or numerical scale) of the velocity data Vd obtained by the differential operation becomes larger so that the velocity data Vd can be obtained with a magnified value.

Figure 3B:
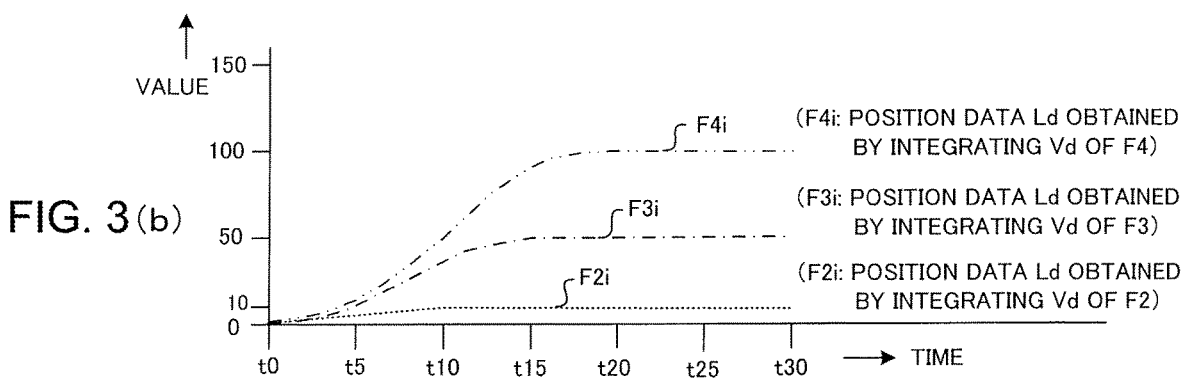

Respective integrated values (namely, position data Ld) of the respective velocity data Vd denoted by the broken line F2, one dot chain line F3 and two-dot chain line F4 in FIG. 3(a) indicate respective characteristics as shown with broken line F2i, one dot chain line F3i and two-dot chain line F4i in FIG. 3(b). It should be noted that a vertical axis of FIG. 3(b) is depicted in a reduced scale that is a one-tenth of a vertical axis of the FIG. 3(a). With respect to the same measured value (primitive position detection data), responsive to the position of the detection object, denoted by the solid line F1 in FIG. 3(a), respective position data Ld indicative of different dynamic range characteristics (or different scale characteristics) are obtained as shown with the broken line F2i, one dot chain line F3i and two-dot chain line F4i in FIG. 3(b). For example, when the measured value (primitive position detection data), responsive to the position of the detection object, denoted by the solid line F1 is stabilized at approximate "10", a value of the position data Ld denoted by the broken line F2i becomes approximate "10", a value of the position data Ld denoted by the one dot chain line F3i becomes approximate "50", and a value of the position data Ld denoted by the two-dot chain line F4i becomes approximate "100". Namely, with respect to the measured value (primitive position detection data) obtained at step 30 on the basis of the oscillation frequency, the position data Ld denoted by the broken line F2i is represented in a scale similar to the measured value, the position data Ld denoted by the one dot chain line F3i is represented in a scale of approximate fifty times the measured value, and the position data Ld denoted by the two-dot chain line F4i is represented in a scale of approximate hundred times the measured value. This reason is because an incremental value (i.e., a value of Vd) for the integral operation is different from each other between the respective time differences. In a case where an amount of the displacement of the detection object is small, even if a variation width (dynamic range) of the measured value (primitive position detection data) obtained at step 30 is small, precise position detection can be achieved by suitably setting the time difference for the differential operation performed at step 31 in such a manner that the position data Ld to be obtained is enlarged in a large scale (dynamic range) as denoted by the two-dot chain line F4i.

In this way, it is possible to adjust by suitably setting the time difference for the differential operation performed at step 31 so that the dynamic range of the position data. Ld obtained by the integral operation performed at step 32 is suitably enlarged. Thus, because a small displacement of the detection object (or a small displacement indicated by the measured value (namely, primitive position detection data) at step 30) can be detected as the enlarged position data Ld in the large dynamic range and the construction itself of the detection device is suitable to be miniaturized (i.e., the simple construction in which the single coil 11 is incorporated in the self-oscillation circuit 13), the present invention can achieve the displacement detection device suitable for small displacement detection or suitable for miniaturization of the device. It should be noted that the detection device may be configured to variably set the time difference for the differential operation performed at step 31 in response to a user's adjusting operation, or the time difference may be preliminarily adjusted by factory setting in conformity of an application purpose of the detection device.

Figure 3C:
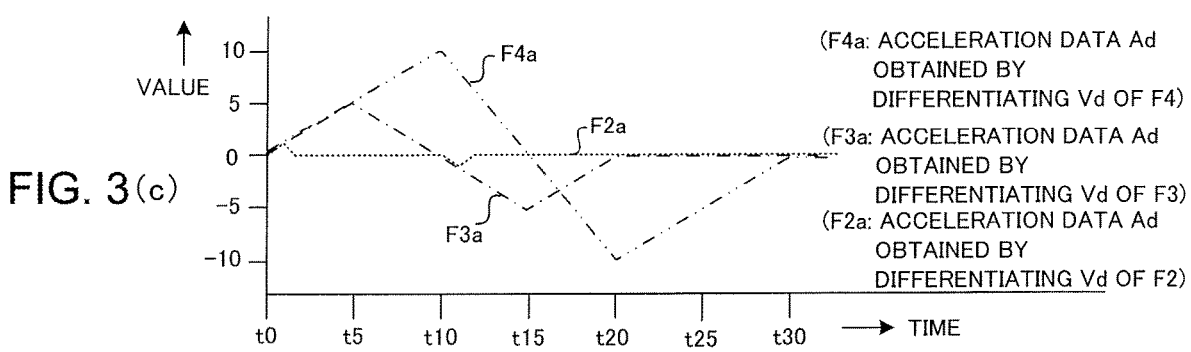
Figure 4:
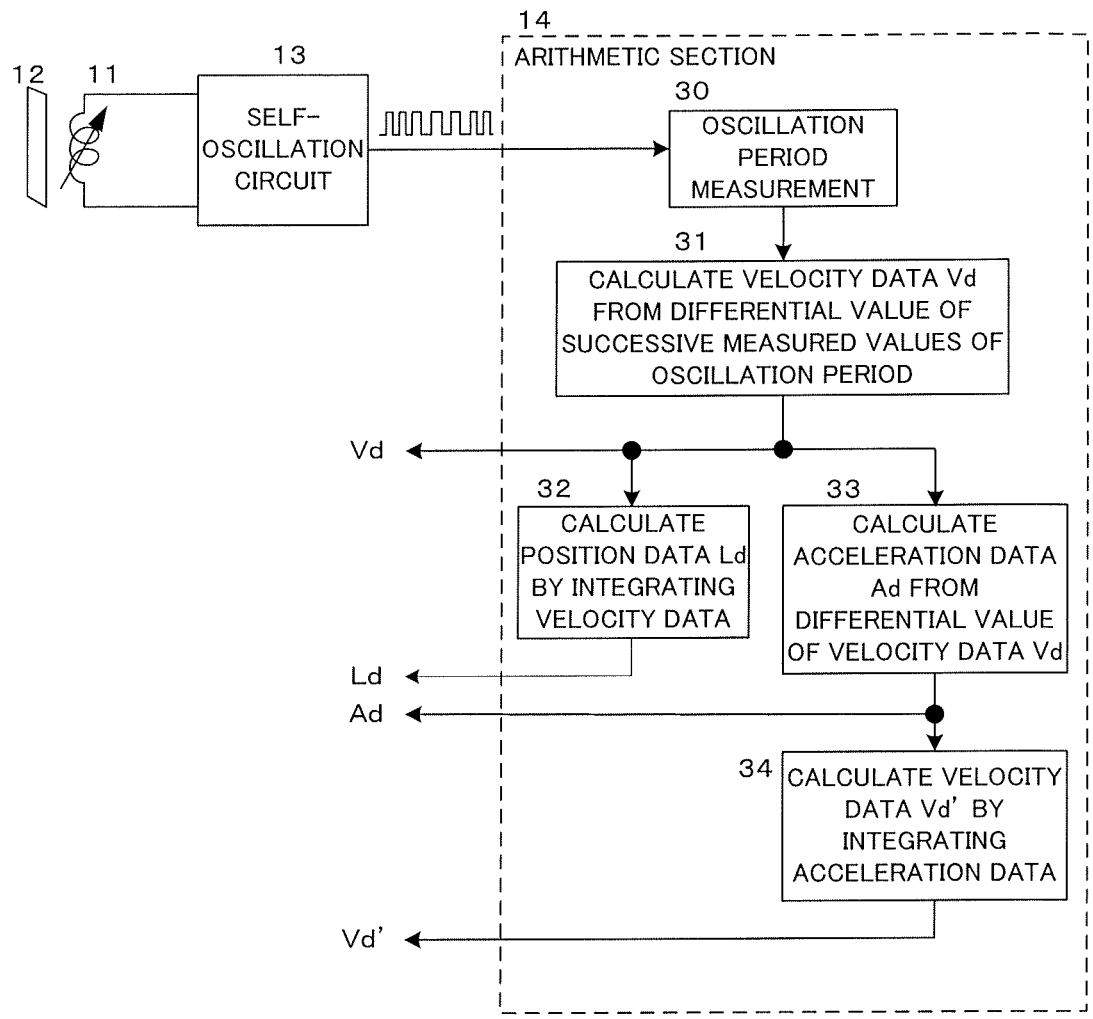
FIG. 4 is a block diagram showing another embodiment of the displacement detection device according to the present invention.

FIG. 4 shows an embodiment in which the arithmetic section 14 can further generate acceleration data. At step 33, acceleration data Ad is calculated by further differentiating the velocity data Vd obtained by step 31 (performing further differential operation). A time difference for the differential operation performed at step 33 may be set to the same as the time difference for the differential operation performed at step 31. FIG. 3(c) shows an example of the acceleration data Ad obtained by step 33 in association with the respective velocity data Vd as shown in FIG. 3(a). Respective differential values (namely, the acceleration data Ad) of the respective velocity data Vd denoted by the broken line F2, one dot chain line F3 and two-dot chain line F4 in FIG. 3(a) indicate characteristics respectively as denoted by a broken line F2a, one dot chain line F3a and two-dot chain line F4a in FIG. 3(c). It should be noted that a vertical axis of FIG. 3(c) is depicted in a slightly-reduced scale as compared with the scale of the vertical axis of the FIG. 3(b). In FIG. 3(c), acceleration data Ad denoted by the broken line F2a is obtained by performing the differential operation of the velocity data Vd denoted by the broken line F2 using a time difference "1", acceleration data Ad denoted by the one dot chain line F3a is obtained by performing the differential operation of the velocity data Vd denoted by the one dot chain line F3 using a time difference "5" that is five times the time difference "1", and acceleration data Ad denoted by the two-dot chain line F4a is obtained by performing the differential operation of the velocity data Vd denoted by the two-dot chain line F4 using a time difference "10" that is ten times the time difference "1".

Figure 3D:
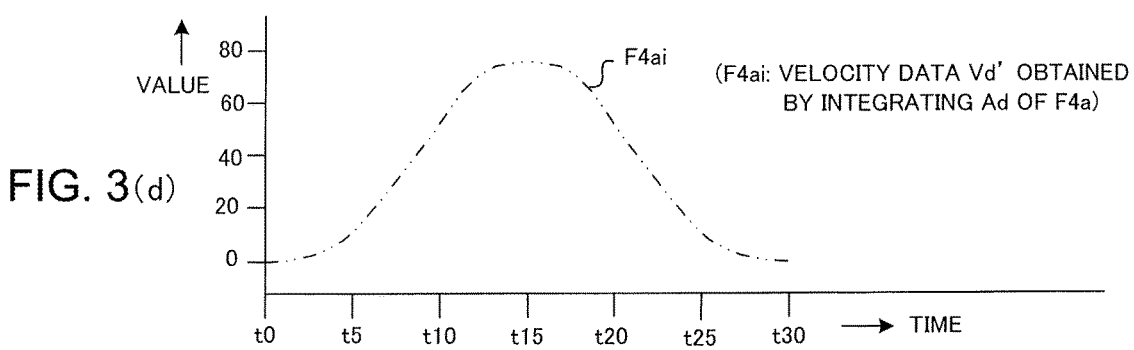

In this way, it is possible to adjust by suitably setting the time difference for the differential operation performed at step 33 in conformity of the time difference for the differential operation performed at step 31 so that the dynamic range of the acceleration data Ad obtained by step 33 is further enlarged. Thus, because a small displacement of the detection object (or a small displacement indicated by the measured value (primitive position detection data) at step 30) can be detected as the enlarged acceleration data Ad in the large dynamic range and the construction itself of the detection device is suitable to be miniaturized (i.e., the simple construction in which the single coil 11 is incorporated in the self-oscillation circuit 13), the present invention can achieve the position (or acceleration) detection device suitable for acceleration detection based on a small or minute displacement or suitable for miniaturization of the device Further, step 34 may be provided as shown in FIG. 4 so that velocity data Vd' is calculated at step 34 by integrating the acceleration data Ad obtained at step 33. With this arrangement, the velocity data Vd' in a larger dynamic range than the velocity data Vd obtained by step 31 can be calculated at step 34. In one example, a two-dot chain line F4ai as shown in FIG. 3(d) denotes velocity data Vd' that is obtained by integrating the acceleration data Ad denoted by the two-dot chain line F4a in FIG. 3(c). It should be noted that a vertical axis of FIG. 3(d) is depicted in a scale more reduced than the scale of the vertical axis of the FIG. 3(c).

The displacement detection device of the present invention according to the aforementioned basic principle can be applied to not only position detection, velocity detection and/or acceleration detection but also other various uses.

Figure 5:
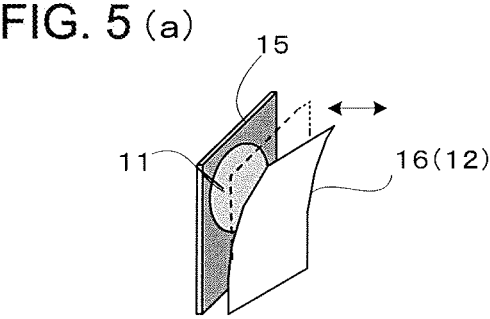
FIG. 5(a) is a perspective view showing an example of a combination of a coil and a magnetism-responsive member in an embodiment in which the displacement detection device of the present invention is applied to a vibration sensor.
FIG. 5(b) is a side view showing another example of the combination of the coil and the magnetism-responsive member in the embodiment applied to the vibration sensor.
Figure 5:
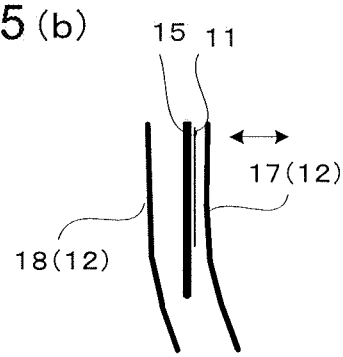

FIGS. 5(a) and 5(b) show examples of a vibration sensor (or impact sensor) to which the displacement detection device according to the present invention are applied, and FIG. 5(a) is a perspective view showing an example of a combination of the coil 11 and the magnetism-responsive member 12 included in one example of the vibration sensor (or impact sensor). In FIG. 5(a), the coil 11 comprising a flat coil is fixed to a fixing section 15, and a moving member 16 comprising a plate spring made of a magnetic material or a non-magnetic and conductive material functions as the magnetism-responsive member 12. The moving member 16 composed of the plate spring vibrates (or is displaced) in response to a mechanical vibration (displacement) of the detection object, and a gap between the coil 11 and the moving member 16 varies with the mechanical vibration (displacement), so that an inductance variation responsive to the mechanical vibration (displacement) is produced in the coil 11. In this case, for example, the detection device may be constructed to supply the position data Ld obtained by the arithmetic section 14 to an appropriate vibration determining circuit (not shown) as a vibration detection signal and detect an occurrence of a vibration or an impact larger than a predetermined threshold value when the vibration determining circuit determines that a value of the vibration detection signal is larger than the predetermined threshold value. Alternatively, the detection device may be constructed to supply the velocity data Vd, the acceleration data Ad or the velocity data Vd' obtained by the arithmetic section 14 to an appropriate determination circuit (not shown) and detect an occurrence of a vibration or an impact larger than a predetermined threshold value when the determination circuit determines that a value of the supplied data is larger than the predetermined threshold value.

FIG. 5(b) is a side view showing an example of a combination of the coil 11 and the magnetism-responsive member 12 included in another example of the vibration sensor (or impact sensor). In FIG. 5(b), the coil 11 comprising the flat coil is fixed to the fixing section 15, a first moving member 17 comprising a plate spring made of a magnetic material is disposed so as to oppose to one surface of the flat coil, and a second moving member 18 comprising a plate spring made of a non-magnetic and conductive material is disposed so as to oppose to another surface of the flat coil, so that both of the first and second moving members 17 and 18 function as the magnetism-responsive member 12. In this case, as well as the aforementioned, the moving members 17 and 18 composed of the plate spring vibrate (displace) in response to a mechanical vibration (displacement) of the detection object, and gaps between the coil 11 and the moving members 17 and 18 vary with the mechanical vibration (displacement), so that an inductance variation responsive to the mechanical vibration (displacement) is produced in the coil 11. It should be noted that because the respective moving members 17 and 18 displace in a push-pull manner such that, as one of the moving members 17 and 18 approaches the coil 11 in response to the mechanical vibration (displacement), another goes away from the coil 11, the inductance produced in the coil 11 additively changes so that precision of detection is enhanced. The way of determining the vibration or impact may be performed similar to the aforementioned.

Figure 6:
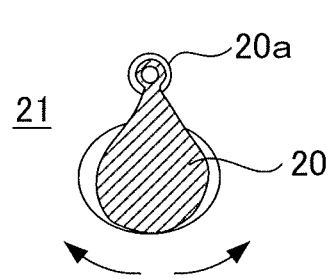
FIG. 6 is a schematic front view showing an example of an inclination sensor to which the displacement detection device of the present invention is applied.

FIG. 6 is a schematic front view showing an example of an inclination sensor to which the displacement detection device of the present invention is applied. In this example, the coil 11 comprising a flat coil is fixed to a fixing section 21, and a swinging member 20 made of a magnetic material or a non-magnetic and conductive material functions as the magnetism-responsive member 12. The swinging member 20 is pivotably attached to a pivot axis 20a. The swinging member 20 is displaced in response to an inclination of the detection object, and the position data Ld responsive to the inclination is obtained by the arithmetic section 14. In this case, the detection device may be constructed to generate information indicative of an amount of the inclination on the basis of the obtained position data Ld, or may be constructed to supply the obtained position data Ld to an appropriate determination circuit (not shown) and detect an occurrence of an inclination larger than a predetermined threshold value when the determination circuit determines that a value of the position data Ld is larger than the predetermined threshold value.

Figure 7:
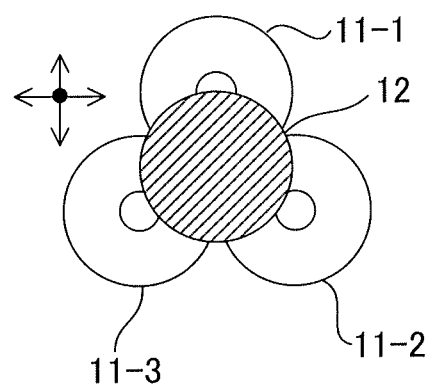
FIG. 7 is a schematic plan view showing an example of a two-dimensional position sensor to which the displacement detection device of the present invention is applied.

FIG. 7 is a schematic plan view showing an example of a two-dimensional position sensor to which the displacement detection device of the present invention is applied. In this example, a plurality of coils 11-1, 11-2, 11-3, . . . , each comprising a flat coil, are two-dimensionally disposed on a fixing surface 22, the magnetism-responsive member 12 made of a magnetic material or a non-magnetic and conductive material is closely spaced, in a non-contact fashion, from the coils 11-1, 11-2, 11-3, . . . disposed on the fixing surface 221, so that the magnetism-responsive member 12 is two-dimensionally displaced relative to the coils 11-1, 11-2, 11-3, . . . . A pair of the self-oscillation circuit 13 and the arithmetic section 14 is provided for each of the coils 11-1, 11-2, 11-3, . . . so that the respective position data Ld responsive to the inductance of the respective coils 11-1, 11-2, 11-3, . . . are obtained by the respective arithmetic sections 14 corresponding to the coils 11-1, 11-2, 11-3, . . . . A two-dimensional position of the detection object is specified by a combination of the respective position data Ld for the respective coils 11-1, 11-2, 11-3, . . . obtained by the respective arithmetic sections 14. Alternatively, the detection device may be constructed such that the coils 11-1, 11-2, 11-3, . . . are incorporated in a single self-oscillation circuit 13, without the pair of the self-oscillation circuit 13 and the arithmetic section 14 being provided for each of the coils 11-1, 11-2, 11-3, . . . , and that a coil-switching circuit is additionally provided so as to selectively connect the single self-oscillation circuit 13 to one of the coils 11-1, 11-2, 11-3, . . . to be used in a time-division manner. In this case, only a single arithmetic section 14 may be provided and constructed in such a manner as to be time-divisionally operated for a plurality of channels (namely, channels corresponding to the respective coils 11-1, 11-2, 11-3, . . . ) in synchronization with the time-divisional selection of the coil to be used in the single self-oscillation circuit 13.

Figure 8:
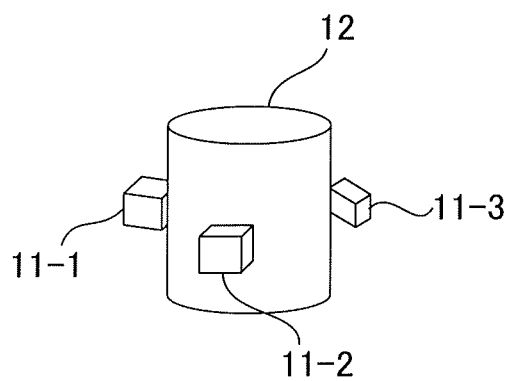
FIG. 8 is a schematic view showing an example of another two-dimensional position sensor to which the displacement detection device of the present invention is applied.

FIG. 8 is a schematic view showing an example of another two-dimensional position sensor to which the displacement detection device of the present invention is applied. In this example, the magnetism-responsive member 12 is constructed as a movable member in a cylindrical shape, and a plurality of coils 11-1, 11-2, 11-3, . . . are fixedly arranged around the movable member. The inductance of the respective coils 11-1, 11-2, 11-3, . . . varies with a two-dimensional displacement of the movable member along a virtual plane orthogonal to an axis line of the cylindrical magnetism-responsive member 12. In this example too, similar to the aforementioned, a pair of the self-oscillation circuit 13 and the arithmetic section 14 is provided for each of the coils 11-1, 11-2, 11-3, . . . (or an additional coil-switching circuit and a single pair of the self-oscillation circuit 13 and the arithmetic section 14 to be used in a time-divisional manner between the plurality of channels are provided), so that the respective position data Ld responsive to the inductance of the respective coils 11-1, 11-2, 11-3, . . . are obtained by the corresponding arithmetic sections 14. A two-dimensional position of the detection object is specified by a combination of the respective position data Ld for the respective coils 11-1, 11-2, 11-3, . . . obtained by the arithmetic sections 14.

Figure 9:
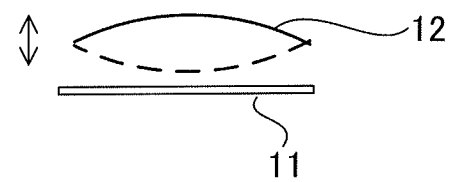
FIG. 9 is a schematic side view showing an example of a pressure sensor to which the displacement detection device of the present invention is applied.

FIG. 9 is a schematic side view showing an example of a pressure sensor to which the displacement detection device of the present invention is applied. In this example, the magnetism-responsive member 12 in a diaphragm shape is closely spaced, in a non-contact fashion, from the coil 11 comprising a flat coil, so that a distance between the coil 11 and the magnetism-responsive member 12 varies with a pressure of the detection object. With such arrangement, the inductance of the coil 11 varies in response to the pressure of the detection object, and the pressure of the detection object is specified by the position data Ld obtained by the arithmetic section 14. Note that, in FIG. 9, a broken line exemplarily shows a displacement of the magnetism-responsive member 12. A strain sensor or load sensor can be constructed similarly to FIG. 9.

Figure 10:
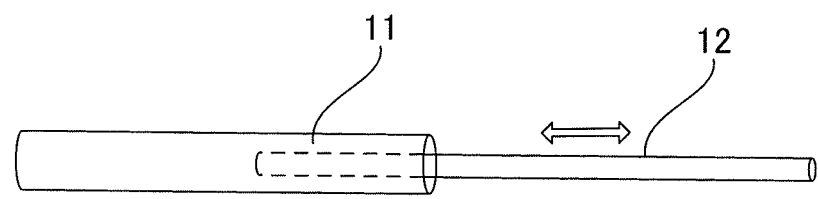
FIG. 10 is a schematic view showing an example of a linear position sensor to which the displacement detection device of the present invention is applied.

FIG. 10 is a schematic view showing an example of a linear position sensor to which the displacement detection device of the present invention is applied. The detection device is constructed such that a rod-like magnetism-responsive member 12 can be linearly displaced in an inner space of a cylindrical coil 11 so that the inductance of the coil 11 varies with a linear position of the magnetism-responsive member 12. Thus, the linear position of the detection object is specified by the position data Ld obtained by the arithmetic section 14. Needless to say, the present invention is not limited to the linear position sensor, and it is possible to apply the invention to a rotational sensor.

Figure 11A:
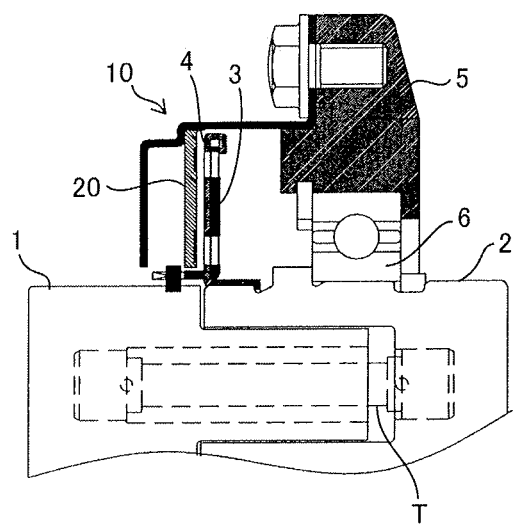
FIGS. 11(a), 11(b), and 11(c) are diagrams showing an example of a torque sensor to which the displacement detection device of the present invention is applied.
Figure 11B:
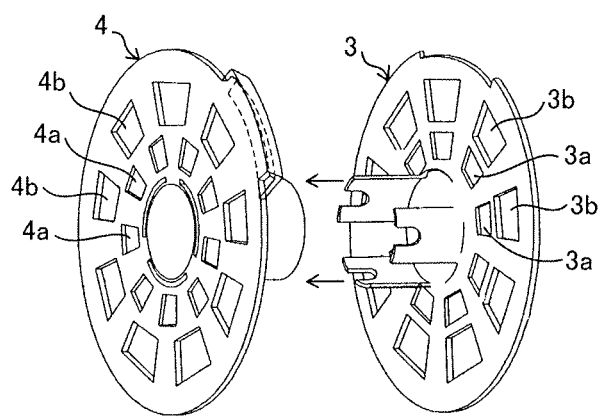
Figure 11C:
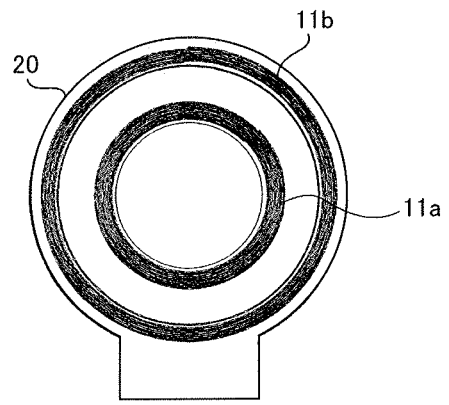

FIG. 11 is a diagram showing an example of a torque sensor to which the displacement detection device of the present invention is applied, and part (a) of FIG. 11 is a cross-sectional side view of the torque sensor in which a half of a sensor section 10 is omitted for convenience of drawing. The torque sensor according to the embodiment shown in FIG. 11 detects a torsional torque loaded to a torsion bar T of a steering shaft of a vehicle. As known in a conventional steering shaft, an input shaft 1 and an output shaft 2 each made of a magnetic shaft (i.e., magnetic material such as iron) are coaxially connected with each other, and these input and output shafts 1, 2 are rotatable relative to one another in a limited range that torsional deflection permits. A first magnetism-responsive member 3 connected to the input shaft 1 and a second magnetism-responsive member 4 connected to the output shaft 2 function as the magnetism-responsive member 12. In this embodiment, one of the magnetism-responsive members 3, 4 is made of magnetic substance and another is made of diamagnetic substance (e.g., aluminum).

Part (b) of FIG. 11 is an exploded perspective view of the magnetism-responsive members 3, 4. Each of the magnetism-responsive members 3, 4 forms in a plate-like shape (i.e., a disk shape or ring-like disk shape) having a plurality of window patterns in a circumferential direction, and respective plates of the magnetism-responsive members 3, 4 are closely spaced from one another in such a manner as to oppose to each other in the respective window patterns. As known in a conventional torque sensor, a window pattern means an alignment of patternized windows, and the window means a portion in which predetermined magnetism-responsive ability of the magnetism-responsive members 3, 4 is lost (or varies). In this embodiment, the window patterns are two channels of patterns that include an inner pattern of opening windows 3a, 4a and an outer pattern of opening windows 3b, 4b. As known in the conventional torque sensor, variation of overlapped portions in the windows between two magnetism-responsive members 3, 4 fills a role of a magnetic shutter.

In the part (a) of FIG. 11, a sensor substrate section 20 is formed in a disk-like shape (or a ring shape) in whole similar to the plate-like magnetism-responsive members 3, 4, fitted around a shaft portion composed of the input and output shafts 1, 2, and fixed to a base section 5 in a condition close to the first and second magnetism-responsive members 3, 4. The output shaft 2 is attached to the base section 5 via a bearing 6 so as to be rotatable relative to the base section 5. The sensor substrate section 20 comprises, as shown in part (c) of FIG. 11, two coils composed of an inner flat coil 11a and an outer flat coil 11b. These flat coils 11a, 11b respectively function as the aforementioned coil 11. These flat coils 11a, 11b are arranged in such a manner that the inner flat coil 11a corresponds to the inner pattern of opening windows 3a, 4a and the outer flat coil 11b corresponds the outer pattern of opening windows 3b, 4b.

As known in the art, an arrangement of the opening windows 3a, 3b, 4a, 4b is shifted between the channels in such a manner that the variation of overlapped portions in the opening windows 3a, 3b, 4a, 4b for the respective channels represents opposite characteristics in phase between the respective channels. For example, the opening windows of the second magnetism-responsive member 4 are formed (or arranged) such that the channel of the opening windows 4a (first channel) and the channel of the opening windows 4b (second channel) indicate a phase difference of a just half cycle regarding respective repetition cycles of the opening windows 4a and 4b. In such a case, the opening windows of the first magnetism-responsive member 3 are formed (or arranged) such that the channel of the opening windows 3a (first channel) and the channel of the opening windows 3b (second channel) indicate exactly the same phase regarding respective repetition cycles of the opening windows 3a and 3b. Further, the opening windows of the first and second magnetism-responsive members 3 and 4 are formed (or arranged) such that, when a torsional angle of the torsion bar T is a condition of zero, a degree of overlap between the opening windows 3a and 4a of the first channel becomes exactly a half and a degree of overlap between the opening windows 3b and 4b of the second channel becomes exactly a half too. As the torsional angle is produced in a clockwise direction from the condition of zero, for example, the degree of overlap between the opening windows 3a and 4a of the first channel decreases to thereby increase the inductance of the corresponding first coil 11a, while the degree of overlap between the opening windows 3b and 4b of the second channel increases to thereby decrease the inductance of the corresponding second coil 11b. By contrast, as the torsional angle is produced in a anticlockwise direction from the condition of zero, the degree of overlap between the opening windows 3a and 4a of the first channel increases to thereby decrease the inductance of the corresponding first coil 11a, while the degree of overlap between the opening windows 3b and 4b of the second channel decreases to thereby increase the inductance of the corresponding second coil 11b.

In this way, the sensor section 10 of the torque sensor comprises the first and second magnetism-responsive members 3, 4 and the first and second coils 11a, 11b, and the first and second magnetism-responsive members 3, 4 are constructed to cause the respective inductance variations in the first and second coils 11a, 11b, which present opposite characteristics, in response to a relative rotational position (namely, the torsional angle) between the input and output shafts (namely, the first and second shaft) 1, 2. In a case where the present invention is applied to the torque sensor having such a construction as aforementioned, a first combination of the first coil 11a and respective portions of the magnetism-responsive members 3, 4 related to the opening windows 3a, 4a for the first channel corresponds to a combination of the coil 11 and the magnetism-responsive member 12 shown in FIG. 1, and the self-oscillation circuit 13 and the arithmetic section 14 are provided in association with the first combination. Further, a second combination of the second coil 11b and respective portions of the magnetism-responsive members 3, 4 related to the opening windows 3b, 4b for the second channel corresponds to another combination of the coil 11 and the magnetism-responsive member 12 shown in FIG. 1, and the self-oscillation circuit 13 and the arithmetic section 14 are provided in association with the second combination. Each position data Ld obtained by each arithmetic section 14 for each channel is torque detection data for the channel. Namely, in the application of the present invention to the torque sensor, the displacement detection device comprising the coil 11, the magnetism-responsive member 12, the self-oscillation circuit 13 and the arithmetic section 14 as shown in FIG. 1 is provided for each of two channels, and two displacement detection data Ld presenting the opposite characteristics are obtained from the two channels and output as torque detection data of the respective channels.

In the arrangement shown in FIG. 11, the magnetism-responsive member 3 provided on the input shaft 1 opposes to the magnetism-responsive member 4 provided on the output shaft 2 in a axial direction (namely, the opening windows of the respective magnetism-responsive members overlap in the axial direction). However, the present invention is not limited to such an arrangement, and, needles to say, the position detection device according to the present invention can be applied to another type of a torque sensor too in which each of the magnetism-responsive members provided on the input and output shafts 1, 2 is formed in a cylindrical shape and opening windows of the respective magnetism-responsive members overlap in a radial direction.

It should be noted that the function of the arithmetic section 14 can be realized by not only a combination of a microcomputer and a memory storing a software program for realizing the aforementioned processes of respective steps, but also a dedicated digital circuitry such as a custom IC.

What is claimed is:

1. A displacement detection device comprising:

a coil;

a magnetism-responsive member disposed so as to be displaceable relative to the coil according to a position of a detection object;

a self-oscillation circuit that incorporates the coil therein as an oscillation element so that an oscillation frequency of the self-oscillation circuit varies with an inductance variation of the coil responsive to the displacement of the magnetism-responsive member relative to the coil; and an arithmetic section configured to:

generate a measured value as digital primitive position detection data corresponding to the oscillation frequency of the self-oscillation circuit on the basis of an oscillation output signal of the self-oscillation circuit;

generate velocity data by digitally calculating a temporal differential value of the digital primitive position detection data, the temporal differential value of the digital primitive position detection data representing a difference between (i) a first generated measured value corresponding to a first oscillation frequency of the self-oscillation circuit at a first point in time and (ii) a second generated measured value corresponding to a second oscillation frequency of the self-oscillation circuit at a second point in time different from the first point in time; and calculate displacement data by integrating the velocity data generated by digitally calculating the temporal differential value of the digital primitive position detection data.

2. The displacement detection device as claimed in claim 1, wherein the arithmetic section is further configured to variably set a time difference to be used for digitally calculating the temporal differential value of the digital primary position detection data.

3. The displacement detection device as claimed in claim 1, wherein the arithmetic section is further configured to generate acceleration data by digitally calculating a temporal differential value of the velocity data.

4. The displacement detection device as claimed in claim 3, wherein the arithmetic section is further configured to calculate second velocity data by integrating the generated acceleration data.

* * * * *